(12) United States Patent
Ciolfi et al.

(10) Patent No.: US 8,386,222 B2
(45) Date of Patent: Feb. 26, 2013

(54) VARIANTS IN GRAPHICAL MODELING ENVIRONMENTS

(75) Inventors: John Edward Ciolfi, Wellesley, MA (US); Yang Guo, Plainsboro, NJ (US); Ramamurthy Mani, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 12/794,290

(22) Filed: Jun. 4, 2010

(65) Prior Publication Data

US 2010/0241409 A1  Sep. 23, 2010

Related U.S. Application Data

(63) Continuation of application No. 11/013,238, filed on Dec. 14, 2004, now Pat. No. 7,742,903.

(60) Provisional application No. 60/580,212, filed on Jun. 15, 2004.

(51) Int. Cl.
*G06G 7/48* (2006.01)
(52) U.S. Cl. .......................................................... 703/6
(58) Field of Classification Search .................... 703/6
See application file for complete search history.

(56) References Cited

U.S. PATENT DOCUMENTS

| 5,930,154 | A | 7/1999 | Thalhammer-Reyero |
| 5,980,096 | A | 11/1999 | Thalhammer-Reyero |
| 6,096,094 | A | 8/2000 | Kay et al. |
| 6,349,274 | B1 | 2/2002 | Kay et al. |
| 6,868,508 | B2 | 3/2005 | Grey |
| 6,965,800 | B2* | 11/2005 | Schmit et al. .................. 700/29 |
| 7,219,306 | B2* | 5/2007 | Kodosky et al. .............. 715/763 |
| 7,752,138 | B1 | 7/2010 | Dean et al. |
| 2003/0014234 | A1 | 1/2003 | Rehtanz et al. |
| 2003/0107595 | A1 | 6/2003 | Ciolfi |
| 2004/0210592 | A1 | 10/2004 | Ciolfi et al. |
| 2004/0210831 | A1 | 10/2004 | Feng et al. |
| 2005/0267721 | A1* | 12/2005 | Thalhammer-reyero ....... 703/11 |
| 2005/0273305 | A1* | 12/2005 | Thalhammer-Reyero ...... 703/11 |

OTHER PUBLICATIONS

Czarnecki, Krzysztof et al, "Variant Configuration of Software Systems," PESOA, Process Family Engineering in Service-Oriented Applications, BMBF-Project, pp. 1-32, (2004).
Czarnecki, Krzysztof et al, "Generative Programming for Embedded Software: An Industrial Experience Report," Generative Programming and Component Engineering, ACM SigPlan/SigSoft Conference, GPC# 2002, Proceedings, vol. 2487:156-172 (2002).
Schlee, Max, "Generative Programming of Graphical User Interface," AVI 04, 2004, ACM, pp. 403-406 (2004).
Tiihonen, J. et al, "A Practical Tool for Mass-Customising Configurable Products," Proceedings of the 14th International Conference on Engineering Design, (2003).
International Search Report Application No. PCT/US2005/020921, dated Dec. 12, 2005.

* cited by examiner

*Primary Examiner* — Kandasamy Thangavelu
*Assistant Examiner* — Juan Ochoa
(74) *Attorney, Agent, or Firm* — Cesari and McKenna, LLP; Michael R. Reinemann

(57) ABSTRACT

This invention allows users to build, manipulate, and finally deploy various model configurations with little performance overhead, better syntactic clarity and configuration flexibility.

20 Claims, 17 Drawing Sheets

Block dialog contains a "pass through" check box that enables any block to pass input signal to output signal Pass-through off Pass-through on:
Block icon grayed out,
Line showing pass-through connection

Full Code

..................  .
ifdef *variant1*
y = F1(x)
endif
ifdef *variant2*
y = F2(x)
endif
ifdef *variant3*
y= F3(X)
endif

..................

Minimal Code

..................  .
y = F1(x)
..................

Active variant branch = 1

VARIANTS IN GRAPHICAL MODELING ENVIRONMENTS

RELATED APPLICATIONS

The present application is a continuation of U.S. patent application Ser. No. 11/013,238, filed Dec. 14, 2004, now U.S. Pat. No. 7,742,903, which claims priority to a U.S. provisional application, Patent Application No. 60/580,212, filed Jun. 15, 2004, the contents of which are incorporated herein by reference.

FIELD OF THE INVENTION

The present invention relates to graphical modeling environments, in particular to methods, systems and computer program products for providing variants in the graphical modeling environments.

BACKGROUND OF THE INVENTION

Various classes of block diagrams describe computations that can be performed on application-specific computing hardware, such as a computer, microcontroller, FPGA, and custom hardware. Classes of such block diagrams may include time-based block diagrams such as those found within Simulink® from The MathWorks, Inc. of Natick, Mass., state-based and flow diagrams such as those found within Stateflow® from The MathWorks, Inc. of Natick, Mass., and data-flow diagrams. A common characteristic among these various forms of block diagrams is that they define semantics on how to execute the diagram.

Models for complex systems arising in applications domains, such as automotive, aerospace, and communication engineering, are generally developed in a modular fashion allowing them to be used in more than one design project. For instance, while developing an automobile the overall model consists of similar modules, such as an engine module, an engine controller module, a suspension module, a dynamic suspension controller module, etc., regardless of the specific model of the automobile. The main differences arise in how each of the modules in the overall model is configured to obtain a final system level specification of the particular automobile model.

Conventional block diagram modeling environments provide certain mechanisms for allowing users to configure and deploy different configurations for a given model. FIG. 1A depicts an exemplary mechanism for configuring and deploying different configurations in the conventional block diagram modeling environment. The exemplary mechanism utilizes a configurable subsystem that allows users to define several different implementations for a given module in a block diagram via a subsystem within a library 1910. The model designer may define different configurations for the module within the library 1910. In this example, the model designer defines three different signal sources, Ramp, Sine Wave, and Pulse Generator, within the library 1910. Within the library 1910, the designer introduces a special 'Master' block 1920 that configures a standard connectivity interface for the family of the configurations in the library 1910. The Master block 1920 may be configured to include connectivity interfaces for the three signal sources. Once configured, the Master block 1920 becomes a template configurable subsystem that can be dragged into any model. Within the host model 1930, users can then choose between the different subsystems, such as the three signal sources, in the library 1910 by right-clicking on the template block. In this example, Ramp is selected for the configurable subsystem.

The main advantage of configurable subsystems is that they have little or no performance penalty on the execution of the block diagram. Only the active configuration is present in the block diagram once the model has been compiled. However, this mechanism does have the following drawbacks:

1. The configurable subsystem must reside within a library and cannot be placed directly within a model. Thus, there is no way to directly specify a different configuration for a model, only indirectly via libraries.

2. There is reduced syntactic clarity and usability in the block diagrams because users cannot see all of the available configurations in the host model.

3. Users are offered no mechanism for saving away the active configurations. They are constrained to always bundling the model with the library containing all configurable subsystems.

4. Model builders are constrained to using subsystems to represent their model configurations. Hence they do not have the flexibility of using cascades of blocks for each configuration. Such cascades may sometimes be desirable in order to shed more light on the system that is being modeled.

In another conventional block diagram modeling environment, multi-port switch is provided to allow users to configure and deploy different configurations for a given module. FIG. 1B depicts an exemplary model 2000 that includes a multi-port switch block 2010. The multi-port switch block 2010 allows users to switch between different sources, such as Constant, Sine Wave, Modulator, and From Workspace, of a computational module.

The multi-port switch 2010 does have the advantage of being able to implement various configurations as cascaded blocks. However, the multi-port switch block 2010 is mainly designed to allow users to switch between different operating modes in a model at execution time. Consequently, it has certain drawbacks when it is utilized in contexts where users are attempting to switch between different model configurations prior to block diagram execution:

1. To allow for run-time switching between modes, all the blocks in the input branches of a switch are generally included in the compiled and linked versions of the model. This adds a significant performance overhead at the time of block diagram execution. While attempts have been made to optimize away inactive branches of the Switch at the time of execution, these attempts need complex analysis, are not always successful, and still require all of the configurations to be in memory simultaneously.

2. Users can not save away only the active configuration.

SUMMARY OF THE INVENTION

There is a need for graphical modeling environments that provide mechanisms for enabling an individual element (a component or a module) within a graphical model to have multiple implementations that may be swapped in and out by a system designer. The present invention provides such graphical modeling environments that enable the system designer to perceive all possible implementations for the component or module in the graphical model. The present invention also enables the system designer to select one of the implementations for the component or module to build the required specification of the graphical model. The present invention may be useful in the design of any type of graphical model that allows engineers to maintain a single overall model for the entire class of systems they are currently designing. The present invention also enables this model to be configured on demand to exercise specific implementations.

In accordance with one aspect of the present invention, a method is provided for creating and executing a model in a modeling environment. The method includes the step of creating the model to include a plurality of variants of an element in the model. The method also includes the step of compiling the model to execute the model using a first variant of the element. The first variant of the element is one of the plurality of variants included in the model.

In accordance with another aspect of the present invention, a method is provided for creating and executing a model in a modeling environment. The method includes the step of providing a library containing a plurality of variants of an element in the model. The method also includes the step of linking the plurality of variants to the model. The method further includes the step of compiling the model to execute the model using a first variant of the element. The first variant of the element is one of the plurality of variants included in the model.

In accordance with another aspect of the present invention, a method is provided for creating and executing a model in a modeling environment. The method includes the step of providing an element for the model. The method also includes the step of commenting the element out of the model.

In accordance with another aspect of the present invention, a method is provided for creating and executing a model in a modeling environment. The method includes the step of providing a first plurality of variants of a first element in the model. The method also includes the step of providing a second plurality of variants of a second element in the model. The method also includes the step of incorporating the first plurality of variants and the second plurality of variants into the model. The first plurality of variants and the second plurality of variants are provided in different modeling environments.

In another aspect of the invention, a system is provided for generating a model in a modeling environment, wherein the model includes at least an element having a plurality of variants. The system includes means for incorporating the plurality of variants into the model, wherein the plurality of variants perform different functions for the portion of the model. The system also includes means for selecting only one of the plurality of variants for the portion of the model.

In another aspect of the invention, a computer program product is provided for generating a model in the modeling environment, wherein the model includes at least a portion having a plurality of variants. The plurality of variants are incorporated into the model, wherein the plurality of variants perform different functions for the portion of the model. Only one of the plurality of variants is activated for the portion of the model, wherein the activated variant operates for the portion of the model.

In another aspect of the invention, a computer program product is provided for generating a model in the modeling environment, wherein the model includes at least a portion having a plurality of variants. The plurality of the variants are displayed within the model, wherein the plurality of variants perform different functions for the portion of the model. The model is provided with a component for selecting one of the plurality of variants for the portion of the model.

In another aspect of the invention, a computer program product is provided for holding a model, wherein the model includes at least a portion having a plurality of variants. The model includes a plurality of variants incorporated into the model, wherein the plurality of variants perform different functions for the portion of the model. The model also includes an element for selecting only one of the plurality of variants for the portion of the model.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1A:
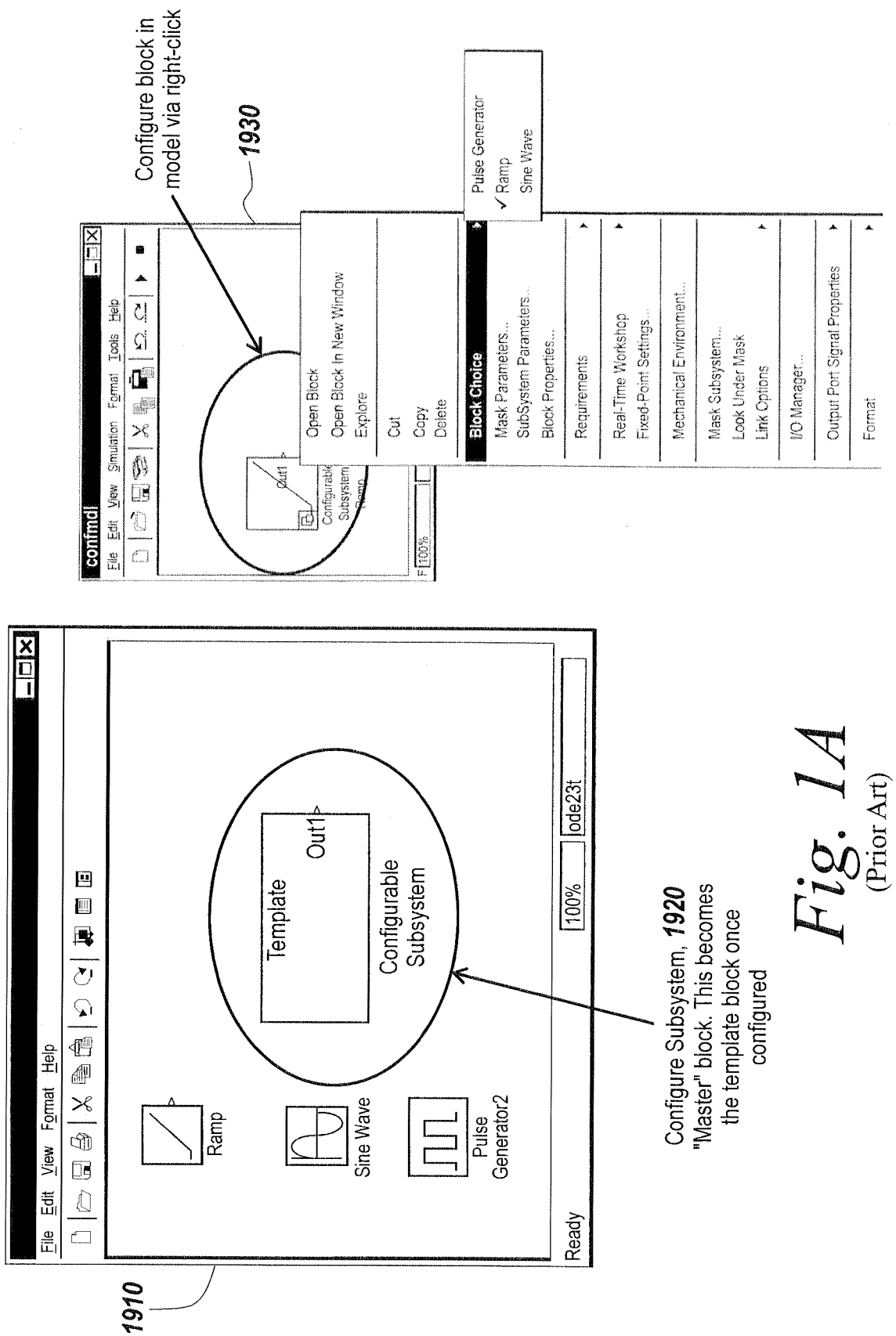
FIG. 1A depicts an exemplary mechanism for configuring and deploying different configurations in the conventional block diagram modeling environment.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a graphical modeling environment in which a graphical model is generated and simulated/executed. In the description of the illustrative embodiment, the simulation of the model is also referred to as the execution of the model. The illustrative embodiment will be described solely for illustrative purposes relative to a time-based block diagram modeling environment and/or a state-based and flow diagram modeling environment. Although the illustrative embodiment will be described relative to the time-based block diagram modeling environment and/or the state-based and flow diagram modeling environment, one of skill in the art will appreciate that the present invention may apply to other graphical modeling environments including data flow modeling environments, a physical (mechanical) modeling environment and Unified Modeling Language (UML) modeling environments as long as the graphical model has some notion of semantics that allows it to be transformed into an executable for a computer processor/microcontroller or directly synthesized in application-specific hardware.

An exemplary time-based block diagram modeling environment can be found in Simulink® from The MathWorks, Inc. of Natick, Mass. Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagram models of the target systems. All of the blocks in a block library provided by Simulink and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® also allows users to simulate the designed target systems to determine the behavior of the systems.

Stateflow® from The MathWorks, Inc. of Natick, Mass., provides an exemplary state-based and flow diagram modeling environment. Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

The illustrative embodiment will be described below relative to a Simulink® model. In other embodiments, the present invention will also be described relative to a Stateflow® model or a combined Simulink®/Stateflow® model. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

The illustrative embodiment of the present invention provides variants of an element (a component or a module) in a block diagram model which users may configure for a particular specification of the model. In the description of the illustrative embodiment, the module may refer to one or more components of the model that perform a particular task. The module may include a subsystem of the model consisting of multiple components of the model. The illustrative embodiment provides parallel implementations of an element in block diagrams and activates one specific implementation on demand. This may be useful in the design of any type of block diagram model that allows engineers to maintain a single overall model for the entire class of systems they are currently designing. This model can then be configured on demand to exercise specific implementations.

The illustrative embodiment enables individual elements within a model to have multiple implementations that may be swapped in and out by the users. The user may choose an implementation between different implementations in a given model. The selected implementation may then be activated during the model compilation process and/or code generation process by defining certain pre-processor symbols. This approach produces efficient executable code that only has one of the implementations within it.

Figure 2A:
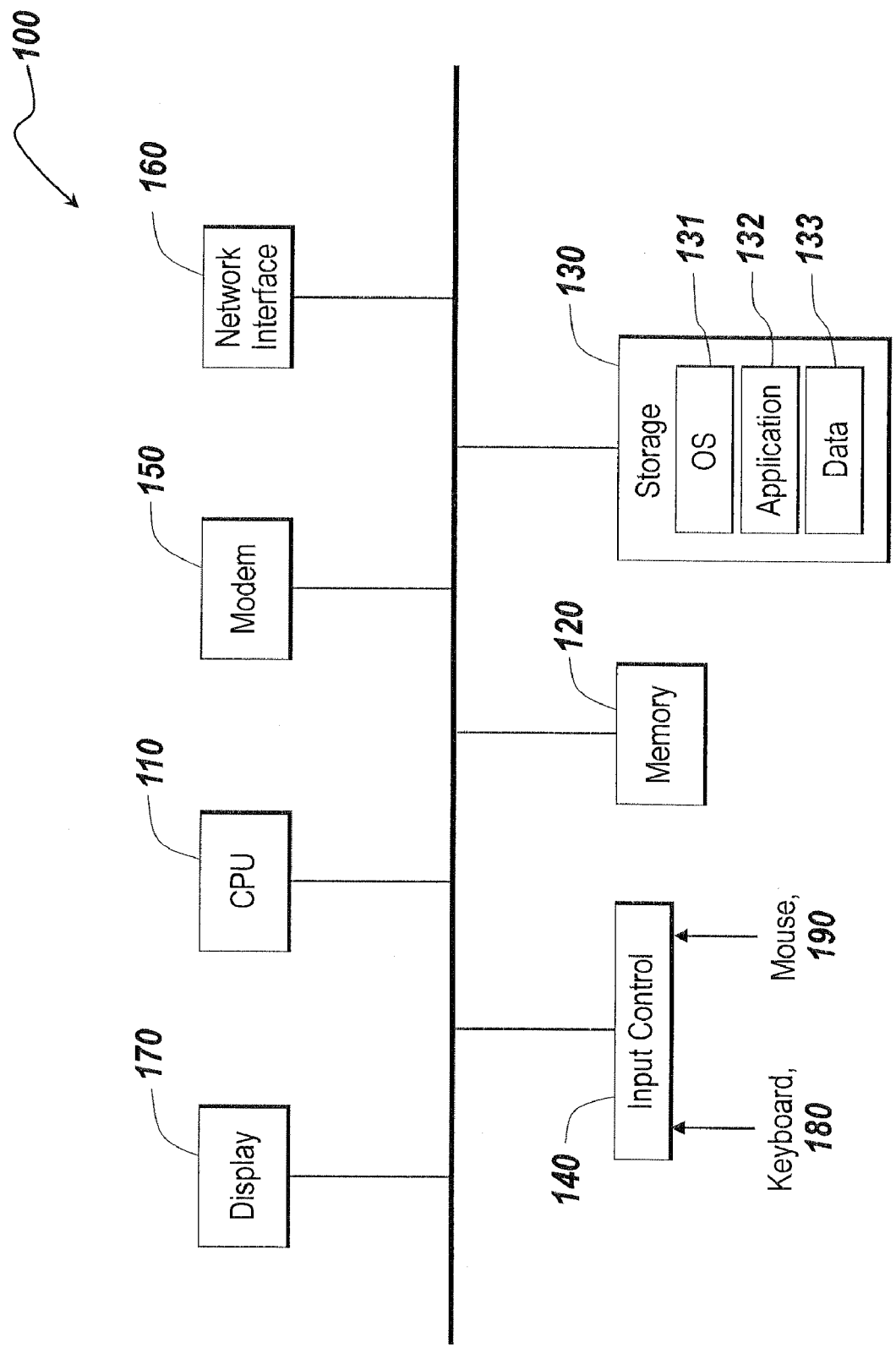
FIG. 2A shows an exemplary computing device suitable for practicing the illustrative embodiment of the present invention.

FIG. 2A is an exemplary computing device 100 suitable for practicing the illustrative embodiment of the present invention, which provides a block diagram modeling environment. One of ordinary skill in the art will appreciate that the computing device 100 is intended to be illustrative and not limiting of the present invention. The computing device 100 may take many forms, including but not limited to a workstation, server, network computer, quantum computer, optical computer, bio computer, Internet appliance, mobile device, a pager, a tablet computer, and the like.

The computing device 100 may be electronic and include a Central Processing Unit (CPU) 110, memory 120, storage 130, an input control 140, a modem 150, a network interface 160, a display 170, etc. The CPU 110 controls each component of the computing device 100 to provide the block diagram modeling environment. The memory 120 temporarily stores instructions and data and provides them to the CPU 110 so that the CPU 110 operates the computing device 100 and runs the block diagram modeling environment. The storage 130 usually contains software tools for applications. The storage 130 includes, in particular, code 131 for the operating system (OS) of the device, code 132 for applications running on the operation system including applications for the block diagram modeling environment, and data 133 for the models created in the block diagram modeling environment.

The input control 140 may interface with a keyboard 180, a mouse 190, and other input devices. The computing device 100 may receive through the input control 140 input data necessary for creating models in the block diagram modeling environment, such as the selection of the attributes and operations of component blocks in the models. The computing device 100 may display in the display 170 user interfaces for the users to edit the models in the block diagram modeling environment.

Figure 2B:
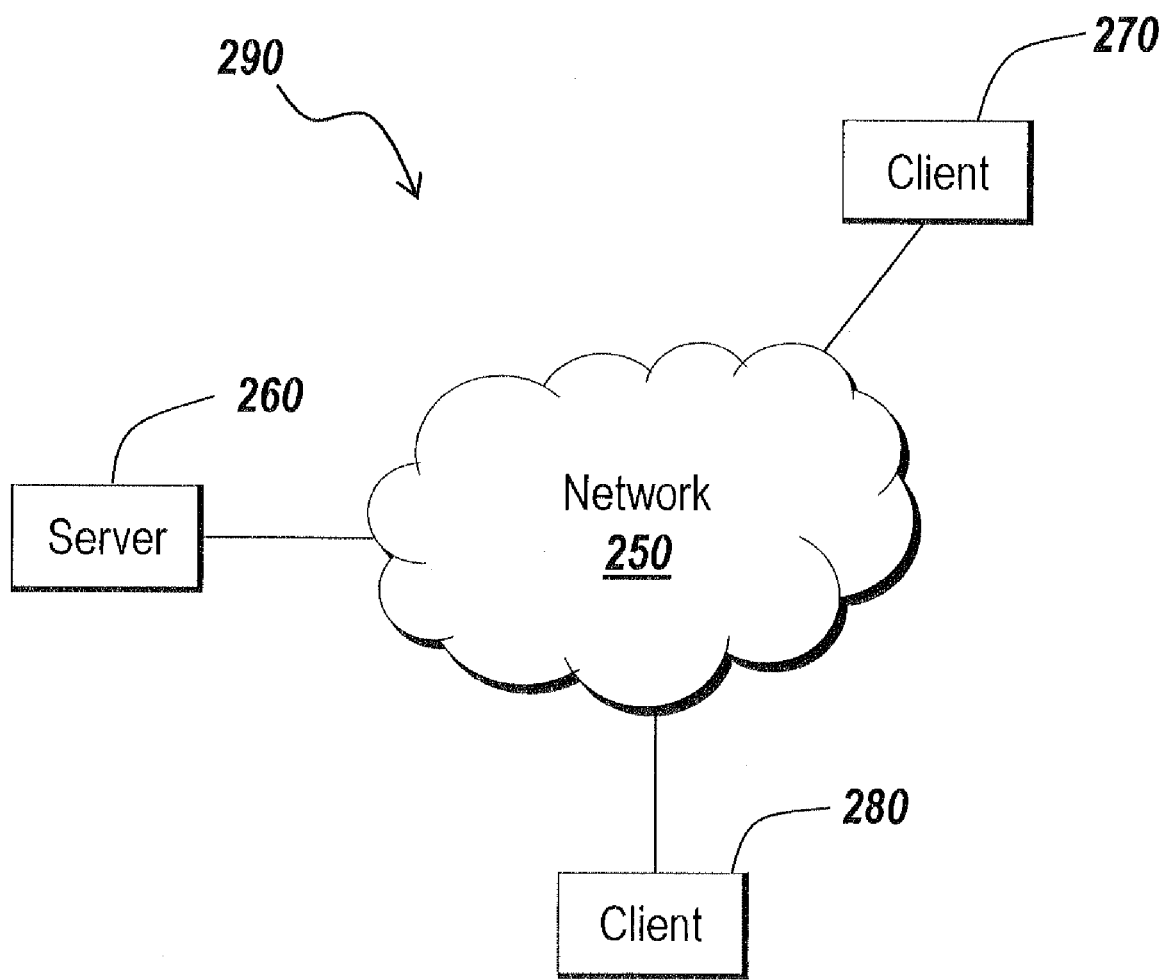
FIG. 2B shows an exemplary network environment suitable for practicing the illustrative embodiment of the present invention.

FIG. 2B is an exemplary network environment 290 suitable for the distributed implementation of the illustrative embodiment of the present invention. The network environment 290 may include a server 260 coupled to clients 270 and 280 via a network 250. The server 260 and clients 270 and 280 can be implemented using the computing device 100 depicted in FIG. 2A. The network interface 160 and the modem 150 of the computing device 100 enable the server 260 to communicate with the clients 270 and 280 through the communication network 250, such as Internet, intranet, LAN (Local Area Network), WAN (Wide Area Network) and MAN (Metropolitan Area Network). The communication facilities may support the distributed implementations of the present invention.

In the network environment 290, the server 260 may provide the clients 270 and 280 with software components or products under a particular condition, such as a license agreement. The software components or products may include those for providing a modeling environment. The software components or products may also include those for modeling a system in the modeling environment. An exemplary licensing scheme is described in more detail in U.S. patent application Ser. No. 10/896,671 entitled "DYNAMIC LICENSING IN A DISTRIBUTED SYSTEM," now U.S. Pat. No. 7,752,138, which is incorporated herewith by reference.

Figure 3A:
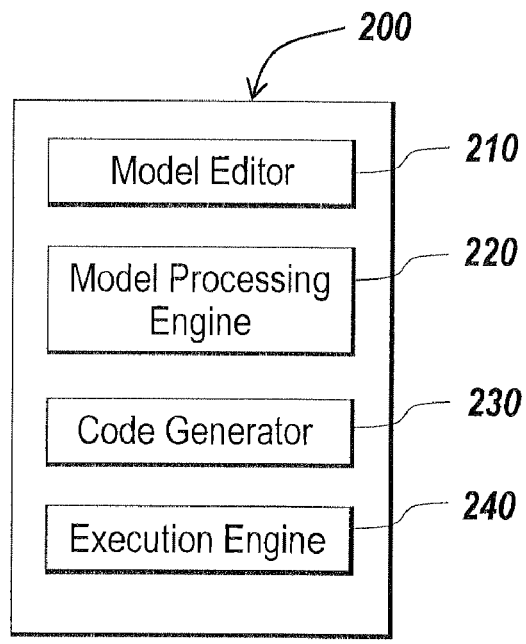
FIG. 3A depicts an exemplary block diagram modeling environment provided in the illustrative embodiment of the present invention.

FIG. 3A depicts an exemplary block diagram modeling environment 200 provided in the illustrative embodiment. The block diagram modeling environment 200 may include a model editor 210, a model processing engine 220, a code generator 230 and a model execution engine 240. FIG. 3 is a flow chart showing an exemplary operation of the block diagram modeling environment 200. Users may create or edit their block diagram model using the model editor 210 (step 310). The editor 210 allows users to perform such actions as draw, edit, annotate, save, and print out block diagram representations of systems. The block diagram model editor 210 may provide a graphical user interface (GUI) component that allows drafting of block diagram model by the users. Methods used in editing are called by the block diagram editor 210 in order to render the block appropriately in the GUI of its parent block diagram. The block diagram model editor 210 may allow users to specify the parameters for the block when they use it in their models. In Simulink®, there is also a textual interface with a set of commands that allow interaction with the graphical editor, such as the textual interface provided in MATLAB®. Using this textual interface, users may write special scripts that perform automatic editing operations on the block diagram.

In creating or editing the block diagram model, the users may use block elements provided in the block diagram modeling environment 200. The block elements may be provided in a library to include all of the pre-defined blocks available to the user when the users are building the block diagram model. Individual users may be able to customize the library to: (a) reorganize blocks in some custom format, (b) delete blocks they do not use, and (c) add custom blocks they have designed. The library allows blocks to be dragged through some human-machine interface, such as the mouse 190 or keyboard 180 from the library on to the window (i.e., model canvas). The graphical version of the block that is rendered on the canvas is called the icon for the block. There may be different embodiments for the library including a tree-based browser view of all of the blocks. An exemplary block library can be found in Blocksets from The MathWorks, Inc. of Natick, Mass., including Gauges Blockset, Aerospace Blockset, Signal Processing Blockset, etc. The users may define their own blocks using, for example, the S-function provided in Simulink®.

Variant Section Blocks

In the illustrative embodiment, the block diagram modeling environment 200 provides variant section blocks, which will be described below in more detail with reference to FIGS. 4-6. Users may build their block diagram models using the variant section blocks. The illustrative embodiment provides four exemplary variant section blocks including a variant start block, a variant end block, a variant source block, and a variant destination block. One of ordinary skill in the art will appreciate that these four variant section block are illustrative and the present invention may be implemented using other alternatives, such as those described below with reference to FIG. 15.

Figure 4:
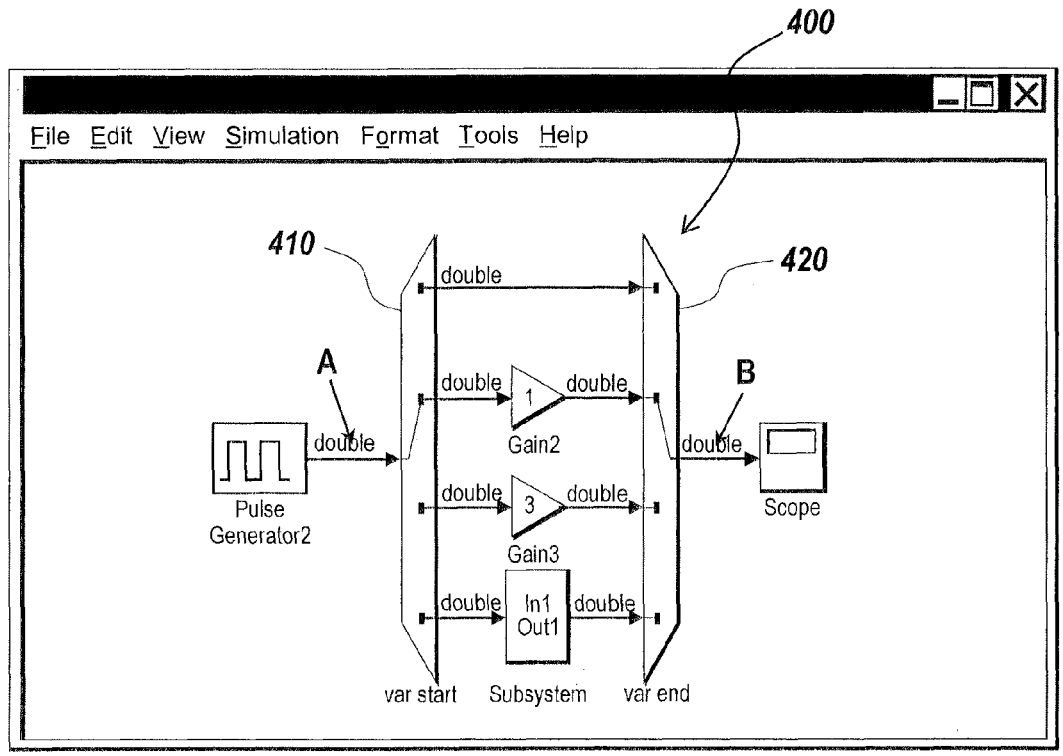
FIG. 4 depicts an exemplary model that includes a variant start block and a variant end block.

FIG. 4 depicts an exemplary model 400 that includes a variant start block 410 and a variant end block 420. This pair of variant section blocks helps select various computational configurations between any two given points of connectivity in a block diagram model. For example, in FIG. 4, there are four different configurations for the computational section between points A and B in the block diagram model 400. Each of the different configurations may include at least an input port and an out port coupled to the variant start block 410 and the variant end block 420, respectively.

Figure 5:
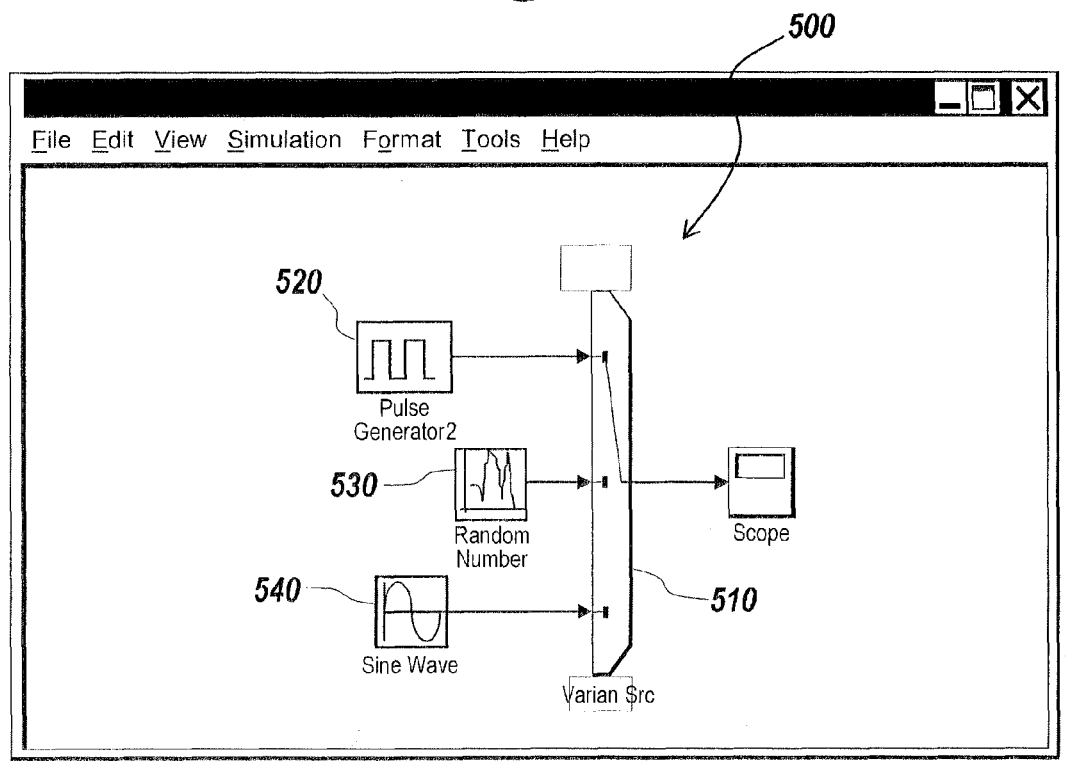
FIG. 5 depicts an exemplary model that includes a variant source block.

FIG. 5 depicts another exemplary model 500 that includes a variant source block 510. The variant source block 510 helps select between multiple source blocks in the block diagram model 500. In the illustrative embodiment, the source blocks refer to any blocks that do not include an input port. In FIG. 5, the variant source block 510 picks between the source blocks including pulse generator 520, random number generator 530, and since wave generator 540.

Figure 6:
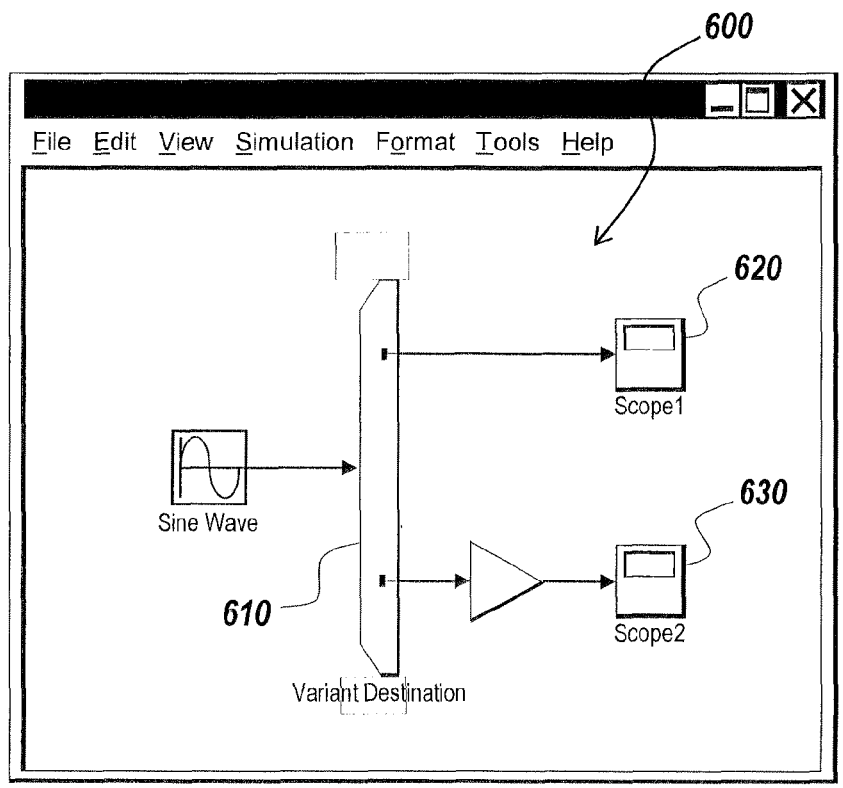
FIG. 6 depicts an exemplary model that includes a variant destination block.

FIG. 6 depicts another exemplary model 600 that includes a variant destination block 610. The variant destination block 610 helps select between multiple destination blocks in a block diagram model 600. In the illustrative embodiment, the destination blocks refer to any blocks that do not include an output port. In FIG. 6, the variant destination block 610 picks between the destination blocks including a scope block 620 and scope2 block 630.

Variant section blocks are depicted with special icons on the block diagram model as illustrated in the examples above. One of skill in the art will appreciate that these icons are illustrative and other icons that are specific to given graphical modeling environments could be used. For instance, in a state chart, the variant start and end could be depicted as circles with special markings on them, which will be described below in more detail with reference to FIG. 17.

Figure 7:
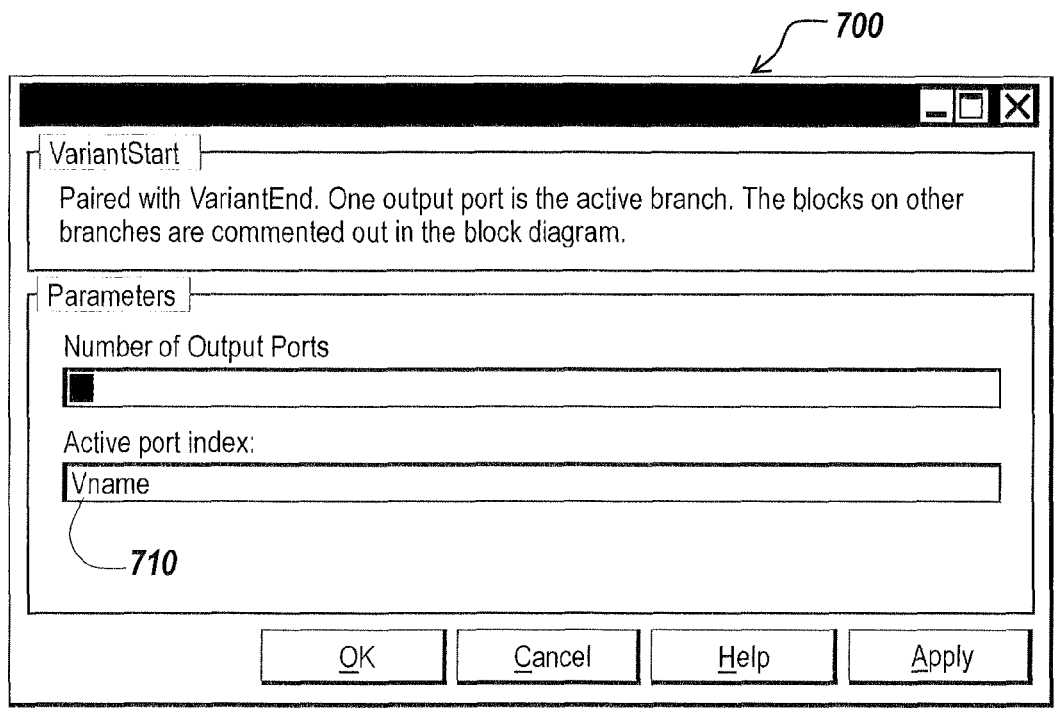
FIG. 7 is an exemplary parameter dialog for variant section blocks.

In each of the variant section blocks described above, the active variant (or active branch of the variant) is chosen in the parameter dialog 700 for the corresponding variant section block(s) as shown in FIG. 7. For example, in the case of the variant start block and the variant end block, the active variant 710 may be specified in either or both blocks. The specification of the active variant on the block may be through a variety of mechanisms: (1) A plain number that indicates the active variant, (2) Associating a textual name with each variant and then allowing users to pick between the variants by specifying the name of the variant, (3) Allowing users to specify a variable whose value is specified in a 'workspace' that is accessible to the model.

Hierarchical Nesting of Variant Section Blocks

Figure 8:
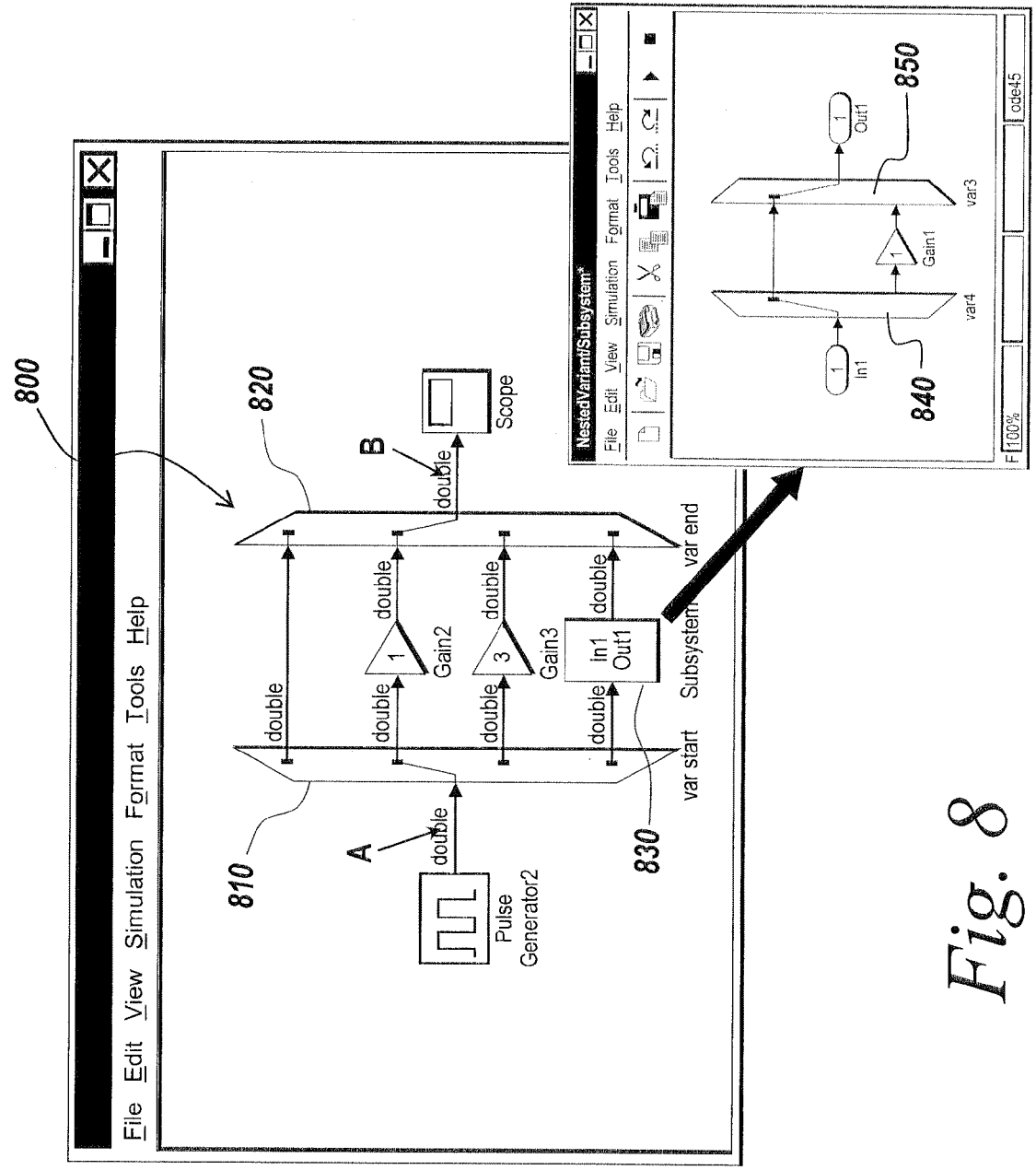
FIG. 8 depicts an exemplary model that includes hierarchically nested variant section blocks.

Variant section blocks can be nested within one another to an arbitrary number of levels in the hierarchy. FIG. 8 depicts an exemplary model 800 that includes hierarchically nested variant section blocks. That is, the exemplary model 800 includes a variant start block 810 and a variant end block 820. There are four different configurations for the computational section between the variant start block 810 and the variant end block 820. One of the configurations is a subsystem 830 that includes another variant start block 840 and variant end block 850. This allows configurations of models to be hierarchical with variants at lower levels in a variant hierarchy becoming more specific on the configuration of a module in the overall model.

Figure 9:
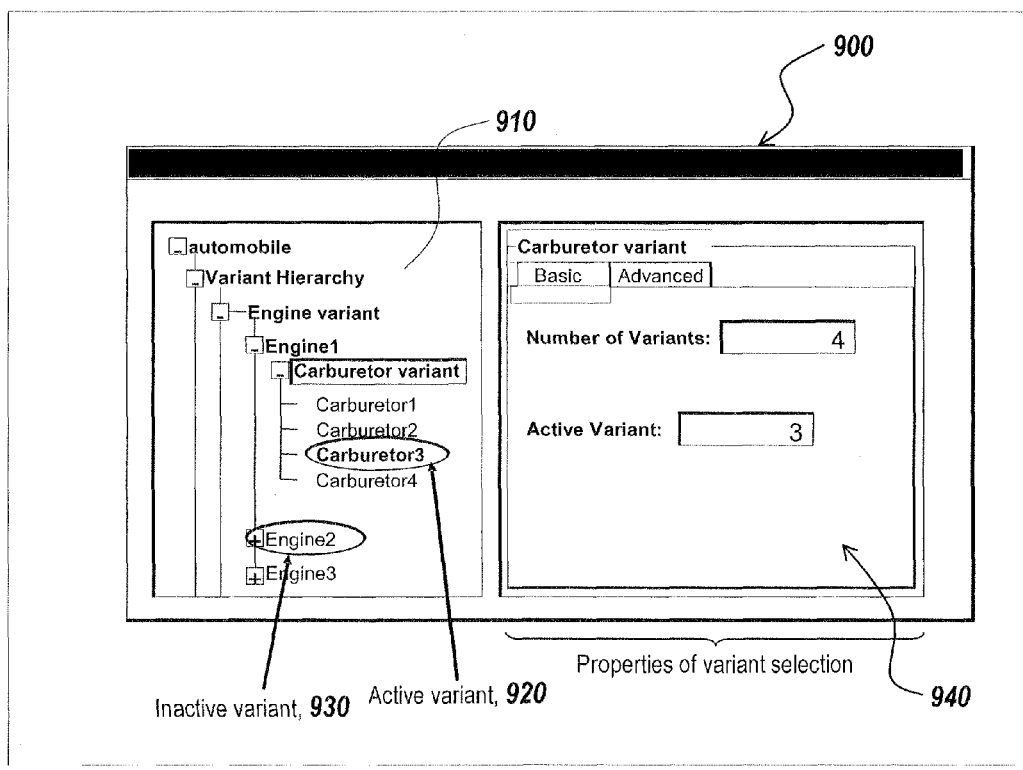
FIG. 9 is an exemplary variant browser presented to users to facilitate the configurability of models with hierarchical variants.

In order to facilitate the configurability of models with hierarchical variants, a variant browser 900 may be presented to model users, as depicted in FIG. 9. The variant browser 900 may provide a hierarchical tree view 910 of all the variants in the block diagram model. Users can then pick the active branch 920 on each variant node in the tree. As nodes in the tree are configured, the effect of the configuration will be reflected in child nodes. For instance, nodes 930 that are disabled as a result of picking a different active configuration can be displayed in gray with appropriate tool tips to indicate that the nodes are disabled. There may also be an interface 940 that provides the parameters of the selected variant in the variant hierarchy of a model. This will allow users to systematically configure and test the model, and then repeat the process to gain full coverage of the model configurations.

User-Interface Enhancements for Variants

Figure 10:
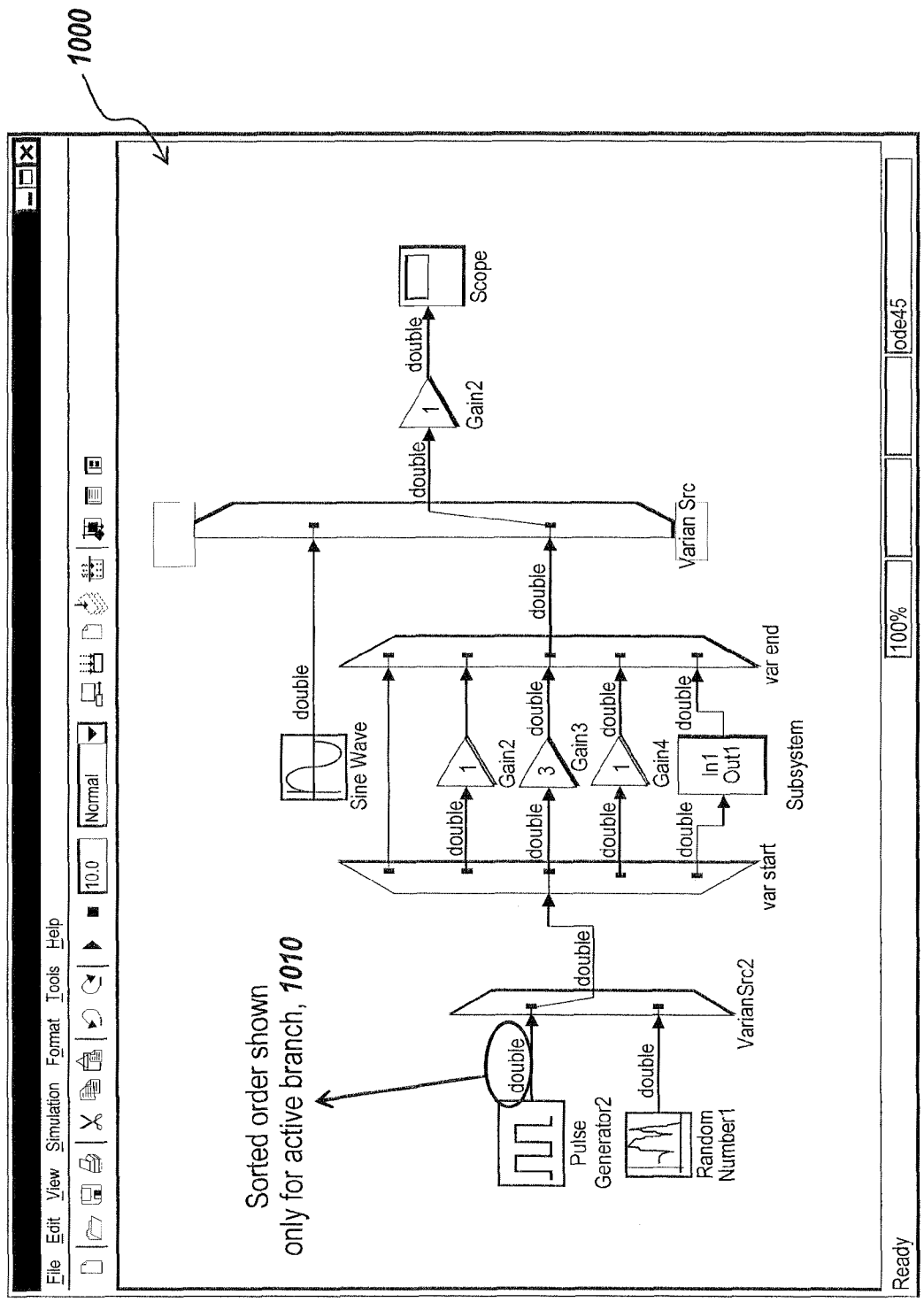
FIG. 10 is an exemplary block diagram model that includes an enhanced user interface provided in the illustrative embodiment.

FIG. 10 is an exemplary block diagram model 1000 that includes an enhanced user interface provided in the illustrative embodiment. The use-interface can be enhanced to show the active variants clearly on the block diagram model. As illustrated in FIG. 10, all inactive variants are faded into the background, while the active variant is left untouched. This allows users to clearly trace the variant connectivity in the block diagram model 1000. Additionally, other display affordances, such as a block sorted order and a block highlighting 1010, could clearly mark only for the active variant.

Interaction with Buses

Figure 11:
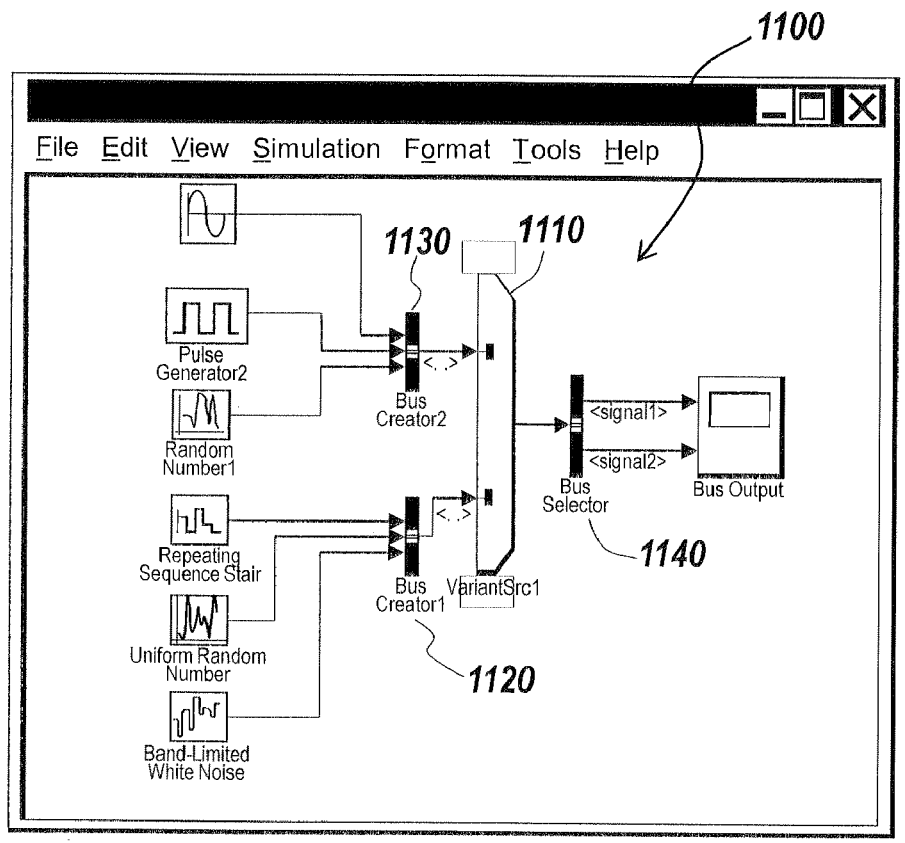
FIG. 11 depicts an exemplary model that includes a variant section block handling a bus signal.

The illustrative embodiment may allow variants to act on groups of signals. The variant section block may be connected to the source and destination of bus signals. For the description of the illustrative embodiment, bus signals refer to hierarchical groupings of individual signals, thereby allowing variants to act on groups of signals. FIG. 11 depicts an exemplary model 1100 that includes a variant section block 1110 handling a bus signal. The variant section block 1110 is coupled to the Bus Creator1 block 1120 and Bus Creator2 block 1130 that combine a set of signals into a bus, i.e., a group of signals represented by a single line in a block diagram. The variant section block 1110 is also coupled to the Bus Selector block 1140 in which there is one output port for each selected signal. The Bus Creator blocks 1120 and 1130, when used in conjunction with the Bus Selector block 1140, allows users to reduce the number of lines required to route signals from one part of a block diagram model to another. The structure of the bus at the points connected via variants can be dissimilar in the illustrative embodiment of the present invention. Also, the restriction of variants to two points of connectivity is not required in the illustrative embodiment of the present invention.

Extension to 'Commenting Out' Portions of Block Diagram

Figure 12:
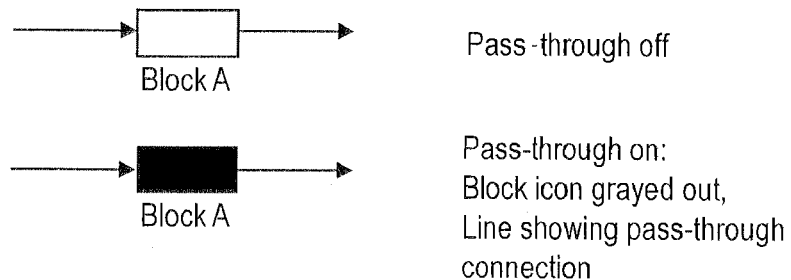
FIG. 12 displays a special affordance in which blocks are commented out on the user interface.

The illustrative embodiment of the present invention may be extended to the notion of "commenting out" blocks in a block diagram model. This idea is similar to commenting out of code written in a textual programming language. The notion of commenting out blocks is akin to a variant in which users are picking between two variant branches: one containing the block itself and the other simply a pass-through branch. Blocks that are commented out are displayed on the user-interface with special affordances as shown in the FIG. 12. The block dialog of Block A may contain a "pass through" check box that enables Block A to pass signals applied to its input port to its output port. In the example depicted in FIG. 12, the upper Block A shows that the "pass through" is off. The lower Block A shows that the "pass through" is on.

Saving the Active Variant

Figure 1B:
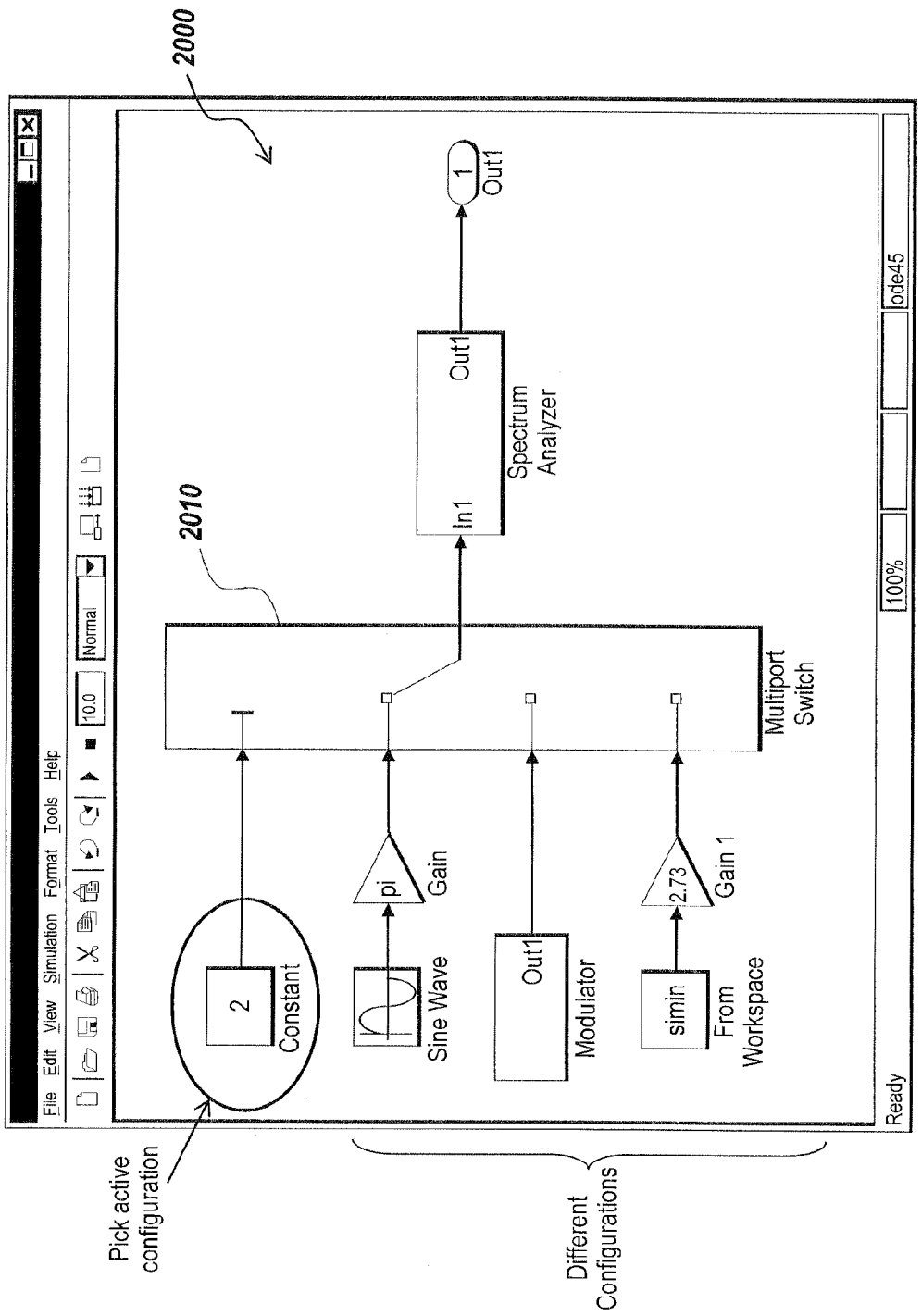
FIG. 1B depicts an exemplary model that includes a multi-port switch block provided in the conventional block diagram modeling environment.
Figure 13:
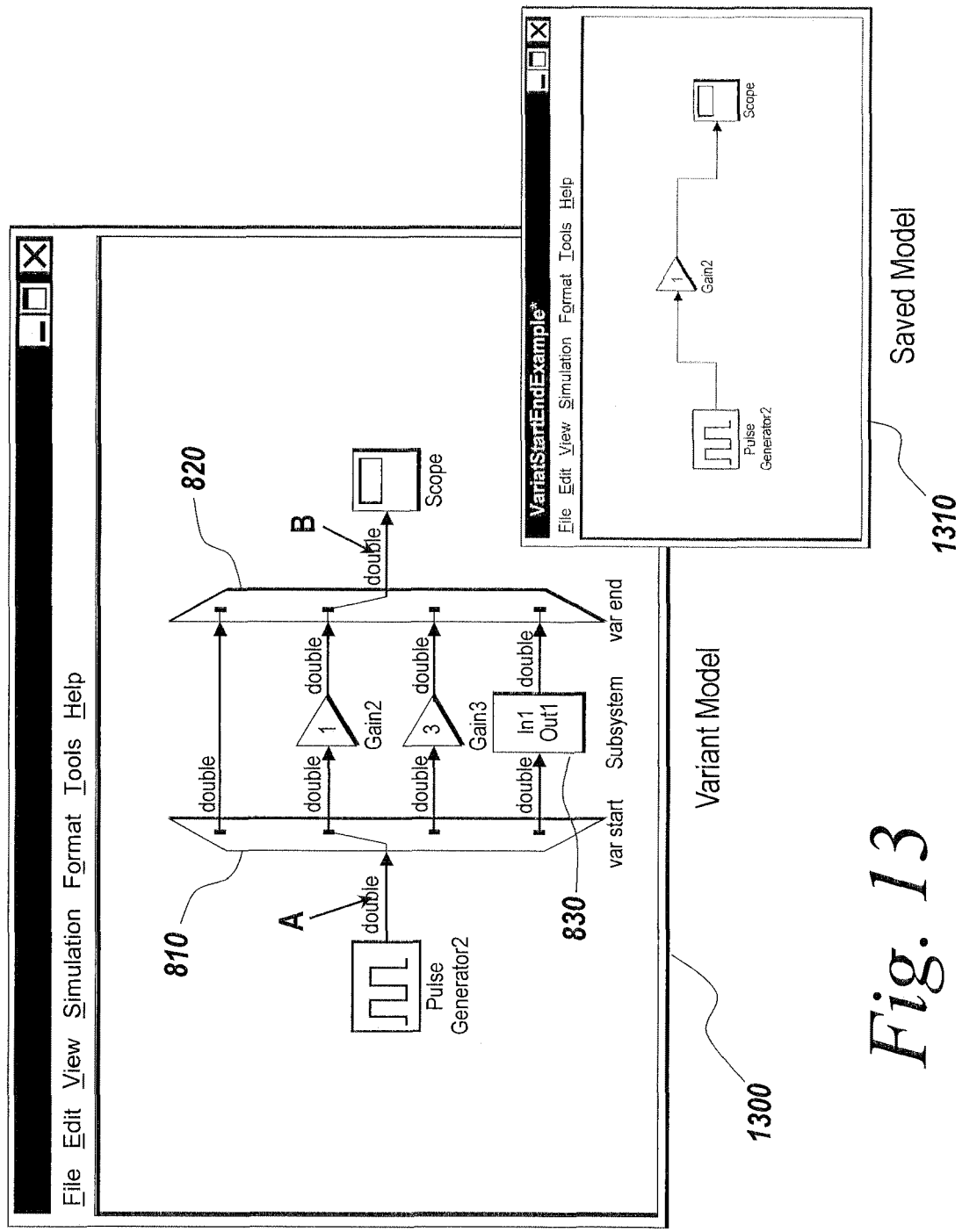
FIG. 13 depicts an exemplary variant model and an exemplary saved model with a variant selected.

Once users have picked the active branch for each variant in the model hierarchy, there may be provided an option to re-save the model with only the active variant. FIG. 13 depicts an exemplary variant model 1300 and an exemplary saved model 1310 with a variant selected. In the exemplary variant model 1300, there are four variants between a variant start block and a variant end block. The users can select one of the variants and save the model 1300 to the exemplary saved model 1310. Choosing this option will cause all the inactive variant branches to be pruned out during the save operation. An advantage of this option is that it allows model builders to build highly generalized models that encompass the diverse requirements of multiple clients through the use of variants. Subsequently for a particular client, they could configure the model in a specific manner, test it, and then finally save it with only the active variant. This pruned model could then be sent to the client with no loss of intellectual property contained in all the other variants that are not relevant to this client. This option can also generally be extended to the configurable subsystem and multi-port switch cases depicted above with reference to FIGS. 1A and 1B, respectively.

Model Compilation Modes

Figure 3B:
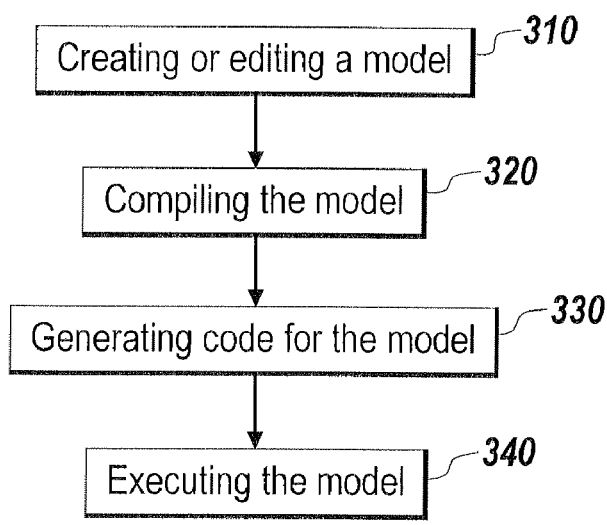
FIG. 3B is a flow chart showing an exemplary operation of the illustrative embodiment of the present invention for creating and executing a model in the block diagram modeling environment.

Referring back to FIGS. 3A and 3B, when the block diagram model is created or edited, the block diagram model is compiled by the model processing engine 220 (step 320 in FIG. 3). The model processing engine 220 carries out the task of compiling and linking the block diagram to produce an "in-memory executable" version of the model that is used for generating code and/or simulating or linearizing a block diagram model. The compilation stage involves preparing data structures and evaluating parameters, configuring and propagating block characteristics, determining block connectivity, and performing block reduction and block insertion. In the link stage, the model processing engine 220 uses the result of the compiled stage to allocate memory needed for the execution of the various components of the block diagram. The linking stage also produces block method execution lists which are used by the simulation or linearization of the block diagram.

During the model compilation, only blocks in the active branch are fully loaded and used during the compilation process. This is done to avoid any performance overhead with having multiple inactive variants in memory. In the compilation of the block diagram model, the illustrative embodiment swap in the active variants from the block diagram model. The inactive variants are swapped out of the block diagram model in the compilation of the block diagram model. This model compilation mode can conditionally be disabled in order to allow users to perform consistency checking between the various variant branches. This option will compile each variant branch in the context of the overall block diagram. This "full compile" option will allow users to check if all variant branches can be successfully compiled in the context of the overall model. This will reveal discrepancies between variant branches in terms of signal attributes such as data types, dimensions, and bus structure.

Code Generation Mode

Figure 14:
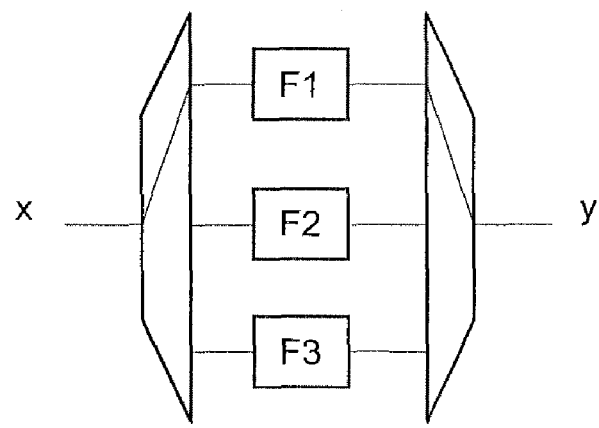
FIG. 14 depicts two possible forms of generated code for an exemplary model.

Referring back to FIGS. 3A and 3B, after linking has been performed, the code generator 230 may generate code for the block diagram model (step 330). If this stage is performed, then the following stages use the generated code during the execution of the block diagram (step 340). If this stage is skipped completely, then the execution engine 240 may use an interpretive mode for the execution of the block diagram (step 340). FIG. 14 depicts two possible forms of generated code for an exemplary system, including full code and minimal code.

In the minimal code generation mode, the code generator 220 generates the code only for the active configuration, i.e., blocks in inactive variant branches are pruned out and do not generate any code. This ensures minimal text or code for the model. The minimal code generation mode has advantages in that intellectual property that may exist in inactive variants doesn't appear within non-active #ifdef/#else/#endif directives. This is important for supplier/original equipment manufacturer (OEM) relationships in which the supplier provides code only for the variants required by the OEM.

Alternatively, users could choose the "full code generation" mode to generate code for all of the variant branches in the model. Each variant branch is then wrapped in special pre-processor compilation directives that are generally available in most standard programming languages. These directives will allow users to configure the active variant during the compilation of the generated code. For example, in C/C++ code, one could '#ifdef/#else/#endif directives to separate the code in each branch of a variant. One can then activate the branch of interest during compilation of the C code by defining an appropriate variant-related symbol in the compilation command. The executable code created by compiling and linking the generated code is equivalent in the minimal code generation mode and in the full code generation mode assuming the C pre-processor correctly eliminates the inactive variants from the full code mode.

Avoiding Performance Penalties

One major advantages of the illustrative embodiment of the present invention over the multi-port switch described above with reference to FIG. 1B is that it avoids any run-time performance overhead. Only the blocks in the active variant take part in the execution, and the code generation process in the minimal code generation mode. The present invention also provides reduction in memory performance overhead when compared to the multi-port switch. Each variant branch may have a library block. During the course of compilation, only the library block corresponding to the active branch in the variant is fully loaded into memory. The loading of the other blocks is deferred until they are actually required.

Other Possible Embodiments of the Present Invention

Figure 15:
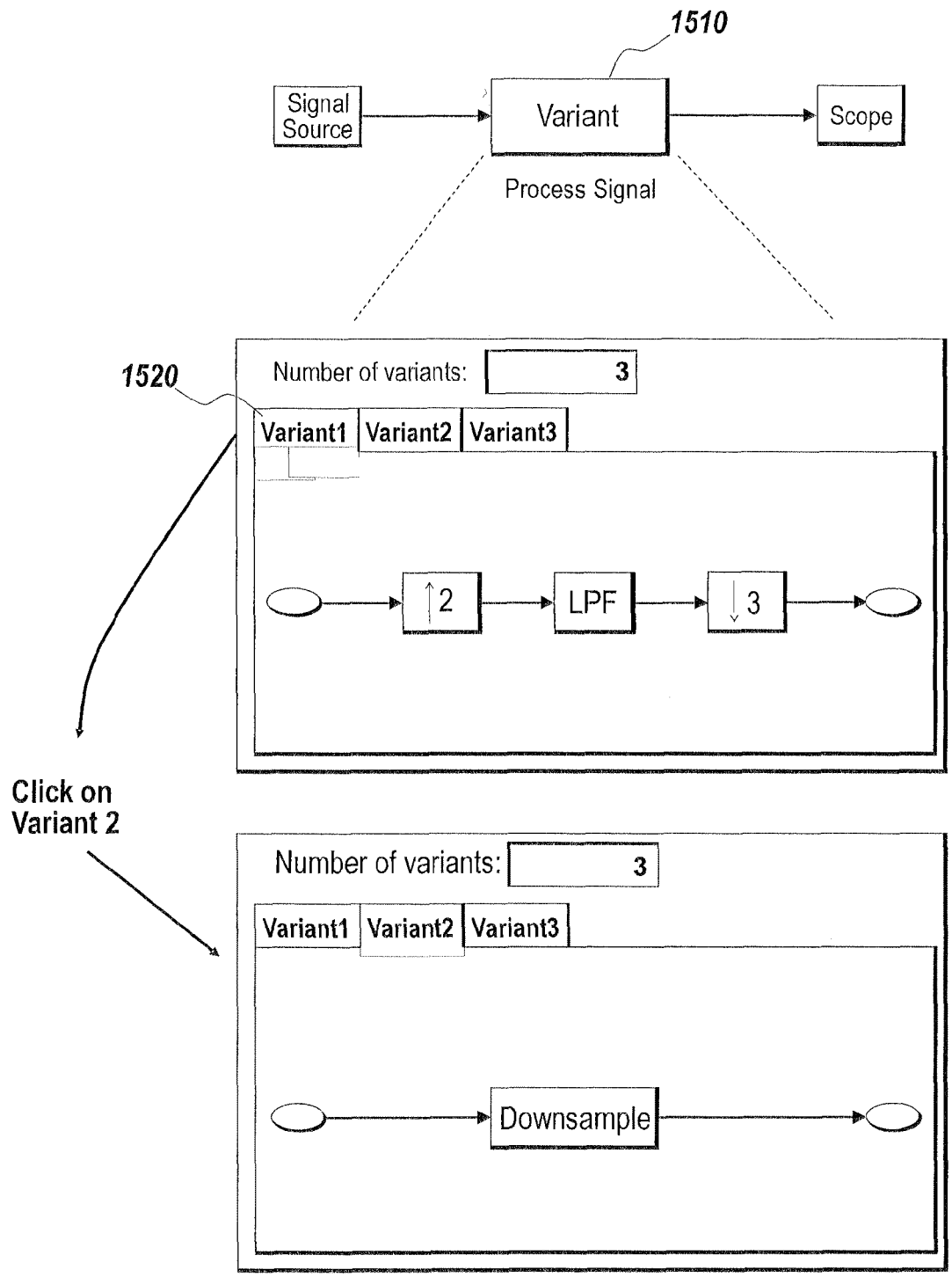
FIG. 15 depicts an example of other possible embodiments of the present invention.

The illustrative embodiment is described relative to variant section blocks in a block diagram modeling environment. One of ordinary skill in the art will appreciate that there could be other embodiments that are equally useful and suitable for the implementation of the present invention. FIG. 15 depicts an example of other possible embodiments of the present invention. In this embodiment, the variants may be expressed as a single block 1510. Each of the variants is shown on a separate tab 1520 when the variant block 1510 is opened.

Variants Applied to Other Block Diagram Modeling Domains

Figure 16:
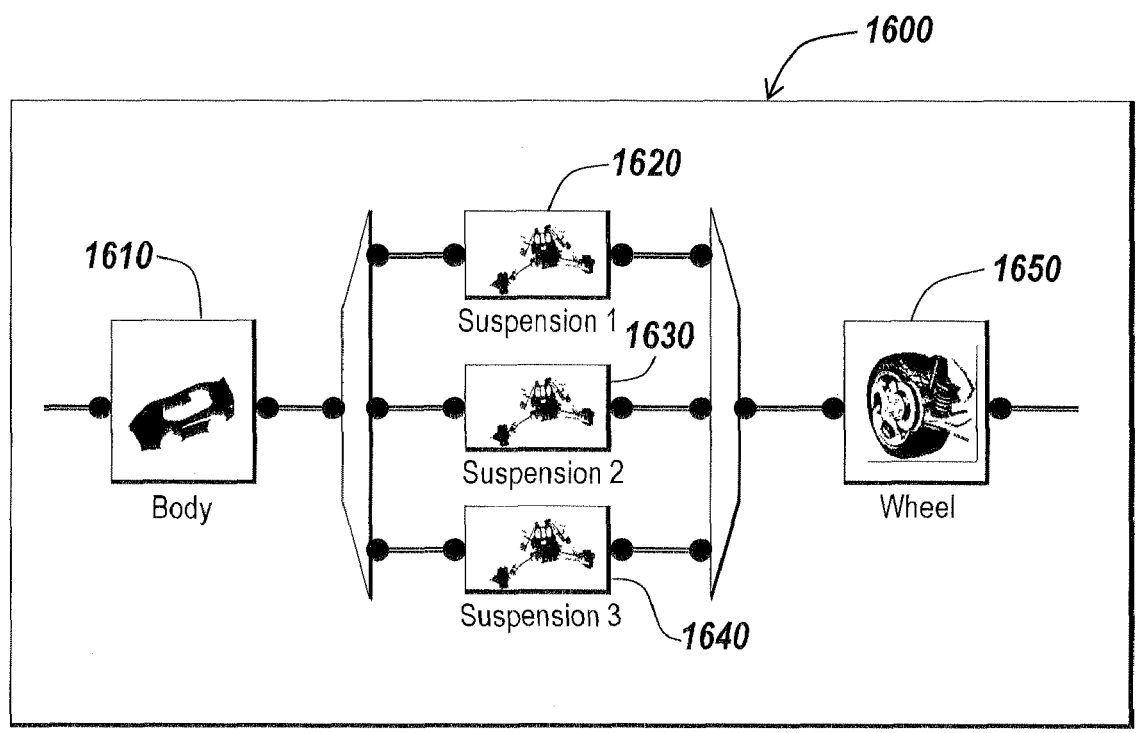
FIG. 16 is an example of a physical modeling application in which variants can be used.

The illustrative embodiment of the present invention is described primarily based on time-based block diagrams to illustrate the concept of variants. The present invention may generally be extended to other modeling domains and computation models in which block diagram models are employed. FIG. 16 is an example of a physical modeling application in which a portion of a vehicle is modeled. In this model 1600, Body 1610 is coupled to Wheel 1650 via a suspension. The model provides variants 1620-1640 for the suspension, such as Suspension 1, Suspension 2 and Suspension 3. The variants 1620-1640 can be selected to try a different model for the suspension of the vehicle.

Figure 17:
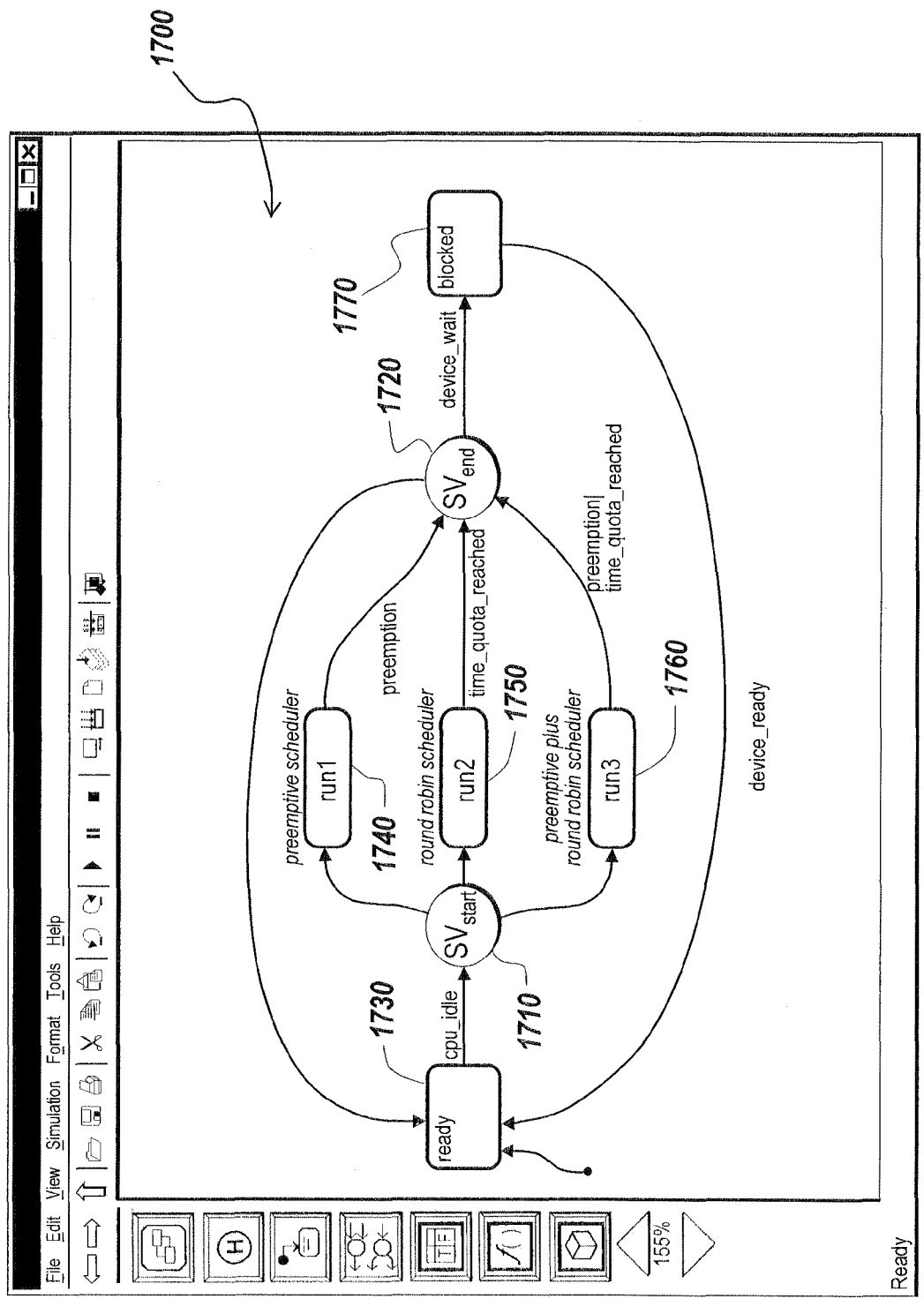
FIG. 17 is an exemplary model in a state-based and flow diagram modeling environment.

FIG. 17 is another exemplary model 1700 in a state-based and flow diagram modeling environment. For example, variants can be specified in Stateflow® in a form akin to that of textual languages like C's #ifdef/#else/#endif pre-processor directives. The state-based and flow diagram model 1700 may include a variant start/destination pair 1710 and 1720. The state-based and flow diagram model 1700 implements the states a process undergoes when running on a CPU 110. The process can be in the ready state 1730 waiting for the CPU 110 to become idle, or in a run state 1740-1760 where the process is running on the CPU 110, or a blocked state 1770 where the process is waiting on a device such as disk I/O. Different scheduling schemes can be applied to the process when in the run state 1740-1760. The three different scheduling schemes in our model are preemptive (run1) 1740, round robin (run2) 1750, or preemptive plus round robin (run3) 1760. These three different schemes are visible on the diagram, yet only one is "active" and during model compilation, the other two are removed from the processing of the system. The SVstart (variant start) junction 1710 and SVend (variant end) junction 1720 are used to configure the behavior of the model 1700. In this model 1700, either or both of the SVstart 1710 the SVend 1720 can be parameterized to specify the active variant, such as run1 state 1740, run2 state 1750, and run3 state 1760.

Figure 18:
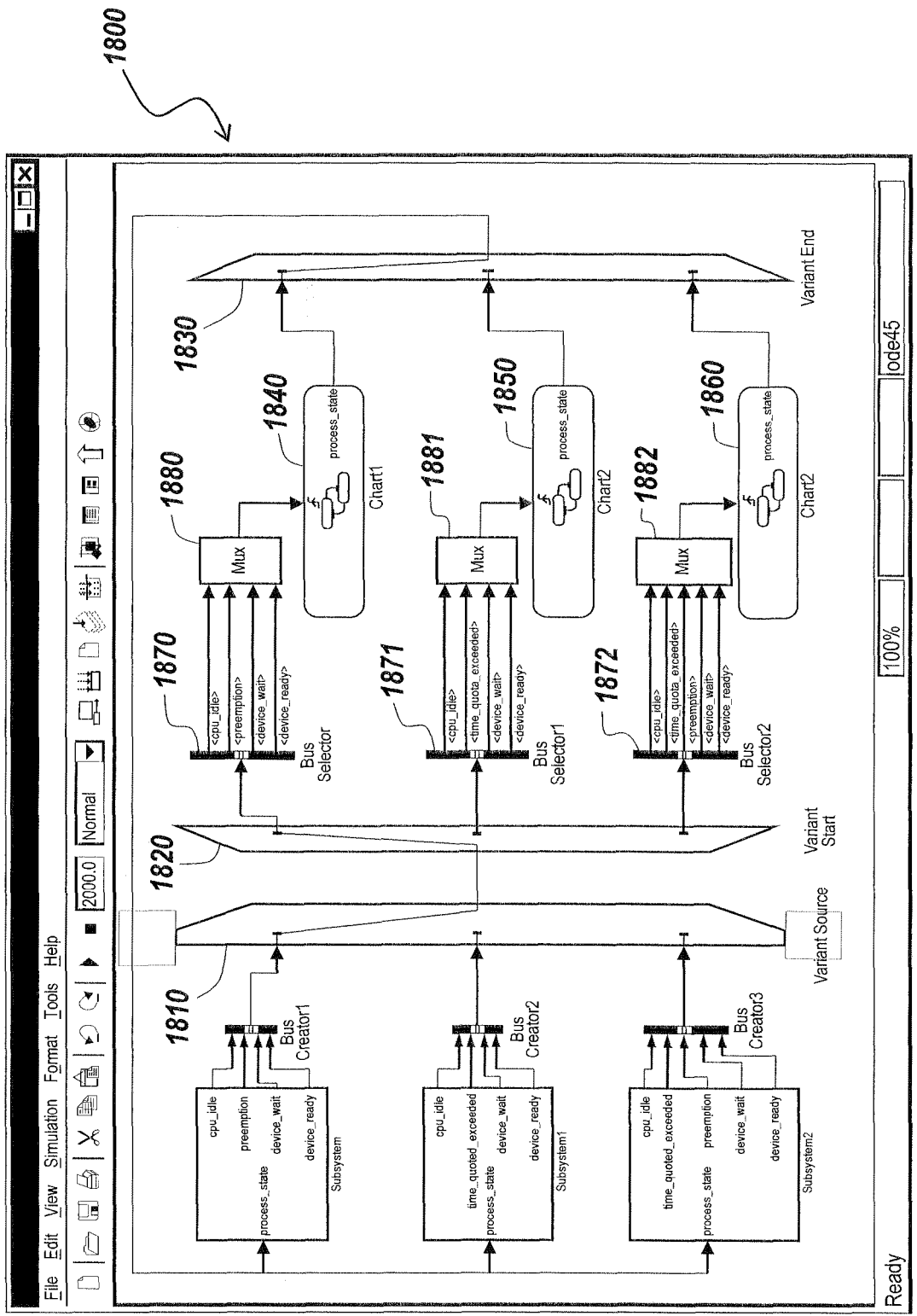
FIG. 18 is an exemplary combined Simulink®/Stateflow® diagram model that includes variant section blocks.

FIG. 18 is an exemplary combined Simulink®/Stateflow® diagram model 1800 that includes events and charts. These items can be linked to the active variant by adding a precondition to them that they only exist when a specified subset of the variants are active. In this figure, the three charts (Chart1, Chart2, and Chart3) are referencing the same chart definition. The first chart (Chart1) 1840 is configured for run1 state 1740, the second chart (Chart2) 1850 is configured for run2 state 1750, and the third chart (Chart3) 1860 is configured for run3 state 1760. The parent model 1800 then feeds the appropriate signals to the chart for the different variants. The three charts 1840-1860 have three different definitions of the trigger signal. The three bus selectors 1870-1872 decompose the bus signals and multiplex them together for the charts 1840-1860. Internally within the Charts 1840-1860, the definition of the trigger signal changes for the active variant among the run1 state 1740, the run2 state 1750 and the run3 state 1760. Since all variants can be parameterized, users can specify a single variable in the Variant Source block 1810, Variant Start block 1820, Variant End block 1830, SVstart 1710 and SVend 1720, and changing this definition will apply across the Simulink®/Stateflow® domain. Additionally, users can choose to combine the Bus Selector 1870-1872, Mux block 1880-1882 into one because it is possible to apply variant selection within the Bus Selector dialog.

This combined Simulink®/Stateflow® diagram illustrates some of the benefits of variants, then can be contained to one domain or shared across domain. This is a simplified model for illustrative purposes and only simulates the behavior of one process. The Discrete Event modeling domain is needed to add multiple processes. Following the general principals provided in this disclosure, one skilled in the art can apply variants to the discrete event domain.

One of ordinary skill in the art will appreciate that the present invention may be implemented in other modeling domains including a "data flow" modeling environment that provides a graphical means of showings an imperative programming environment. In the data flow modeling environment, nodes typically represent operations and execution is often illustrated via the use of tokens, though implementations in practice don't use tokens. Following the steps provided in this disclosure, those of ordinary skill in the art can apply the concept of variants to the data flow modeling domain.

In summary, the benefit of variants is that users can have a single source model for the definition of a system that can be deployed on multiple model configurations. For example, the single source model may be targeted for different air planes or automobiles that vary slightly and these variations need to be captured in the model.

It will be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A method comprising: receiving an indication to select a first variant of an element, the element being part of a block diagram model, the first variant of the element including at least one computational section between end points representing a first execution implementation of a portion of the block diagram model, the element further having a second variant including at least one computational section between the end points representing a second execution implementation of the portion of the block diagram model, the first and second execution implementations being mutually exclusive of each other; and in response to the indication, compiling the block diagram model using the first execution implementation and not using the second execution implementation.

2. The method of claim 1, further comprising: making the first execution implementation active to cause the first execution implementation to be used when compiling the block diagram model; and making the second execution implementation inactive to cause the second execution implementation to not be used when compiling the block diagram model.

3. The method of claim 1, further comprising: swapping out the second execution implementation to make the second execution implementation inactive.

4. The method of claim 1, further comprising: saving the block diagram model, the saved block diagram model including the first execution implementation and not the second execution implementation.

5. The method of claim 1, further comprising: pruning the second execution implementation from the block diagram model; and saving the block diagram model after the second execution implementation has been pruned from the block diagram model.

6. A method comprising: selecting a first variant of an element from among a plurality of variants of the element, the element being part of a block diagram model, the first variant of the element including at least one computational section between end points representing a first execution implementation of a portion of the block diagram model, the element further having a second variant including at least one computational section between end points of the element, among the plurality of variants of the element, representing a second execution implementation of the portion of the block diagram model, and the first and second execution implementations being mutually exclusive of each other; in response to the selecting, making the first execution implementation active and making the second execution implementation inactive; and compiling the block diagram model, the compiled block diagram model including the first execution implementation due to the first execution implementation being active and excluding the second execution implementation due to the second execution implementation being inactive.

7. The method of claim 6, wherein making the second execution implementation inactive further comprises: commenting out a block in the block diagram model, the block being associated with the second execution implementation.

8. The method of claim 6, further comprising: displaying a block diagram of the block diagram model, the block diagram including a first block associated with the second execution implementation and a second block associated with the first execution implementation, the second block being presented differently than the first block, in the displayed block diagram, to indicate that the second block is associated with an implementation that is inactive.

9. The method of claim 6, further comprising: generating an in-memory executable version of the block diagram model from the compiled block diagram model.

10. The method of claim 6, further comprising: generating code from the compiled block diagram model.

11. The method of claim 10 wherein the generated code is minimal code.

12. A non-transitory computer-readable medium for storing one or more computer-executable instructions, the medium comprising one or more instructions for: selecting a first variant of an element, the element being part of a block diagram model, the first variant of the element including at least one computational section between end points representing a first execution implementation of a portion of the block diagram model, the element further having a second variant including at least one computational section between end points representing a second execution implementation of the portion of the block diagram model, and the first and second execution implementations being mutually exclusive of each other; and in response to the selecting, compiling the block diagram model using the first execution implementation and not using the second execution implementation.

13. The medium of claim 12, further comprising one or more instructions for: swapping in the first execution implementation to make the first execution implementation active; and swapping out the second execution implementation to make the second execution implementation inactive, wherein the first execution implementation is used in the compiling of the block diagram model based on the first execution implementation being active and the second execution implementation is not used in the compiling of the block diagram model based on the second execution implementation being inactive.

14. The medium of claim 12, further comprising one or more instructions for: in response to the selecting, making the first execution implementation active and making the second execution implementation inactive; and displaying a block diagram of the block diagram model, the block diagram including a first block associated with the second execution implementation and a second block associated with the first execution implementation, the second block being presented differently than the first block, in the displayed block diagram, to indicate that the second block is associated with an implementation that is inactive.

15. The medium of claim 12, further comprising one or more instructions for: pruning the second execution implementation from the block diagram model; and saving the block diagram model after the second execution implementation has been pruned from the block diagram model.

16. A non-transitory computer-readable medium for storing one or more computer-executable instructions, the medium comprising one or more instructions for: receiving an indication to select a first variant of an element, the element being part of a block diagram model, the first variant of the element including at least one computational section between end points representing a first execution implementation of a portion of the block diagram model, the element further having a second variant including at least one computational section between end points representing a second execution implementation of the portion of the block diagram model, and the first and second execution implementations being mutually exclusive of each other; based on the indication, swapping in the first execution implementation to make the first execution implementation active and swapping out the second execution implementation to make the second execution implementation inactive; and compiling the block diagram model, the compiled block diagram model including the first execution implementation based on the first execution implementation being active and not including the second execution implementation based on the second execution implementation being inactive.

17. The medium of claim 16, further comprising one or more instructions for: commenting out a block in the block diagram model, the block being associated with the second execution implementation.

18. The medium of claim 16, further comprising one or more instructions for: displaying a block diagram of the block diagram model, the block diagram including a first block associated with the second execution implementation and a second block associated with the first execution implementation, the second block being presented differently than the first block, in the displayed block diagram, to indicate that the second block is associated with an implementation that is not included in the compiled block diagram model.

19. The medium of claim 16, further comprising one or more instructions for: generating code from the compiled block diagram model.

20. The medium of claim 19, wherein the generated code is minimal code.

* * * * *